US010387463B2

(12) United States Patent
Campbell et al.

(10) Patent No.: US 10,387,463 B2
(45) Date of Patent: Aug. 20, 2019

(54) DIALOG AGENT FOR CONDUCTING TASK-ORIENTED COMPUTER-BASED COMMUNICATIONS

(71) Applicant: International Business Machines Corporation, Armonk, NY (US)

(72) Inventors: Murray S. Campbell, Yorktown Heights, NY (US); Miao Liu, Ossining, NY (US); Biplav Srivastava, Westchester, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 57 days.

(21) Appl. No.: 15/643,049

(22) Filed: Jul. 6, 2017

(65) Prior Publication Data

US 2019/0012371 A1 Jan. 10, 2019

(51) Int. Cl.
| | |
|---|---|
| G06F 17/27 | (2006.01) |
| G10L 15/06 | (2013.01) |
| G10L 15/22 | (2006.01) |
| G06F 16/332 | (2019.01) |
| G10L 15/18 | (2013.01) |
| G06F 3/16 | (2006.01) |
| G06F 16/9032 | (2019.01) |
| G06F 16/242 | (2019.01) |

(52) U.S. Cl.
CPC .......... *G06F 16/3329* (2019.01); *G06F 3/167* (2013.01); *G06F 16/243* (2019.01); *G06F 16/90332* (2019.01); *G06F 17/279* (2013.01); *G06F 17/2785* (2013.01); *G10L 15/063* (2013.01); *G10L 15/1822* (2013.01); *G10L 15/22* (2013.01)

(58) Field of Classification Search
CPC ...... G10L 15/22; G10L 15/063; G06F 17/279
See application file for complete search history.

(56) References Cited

U.S. PATENT DOCUMENTS

| | | | |
|---|---|---|---|
| 6,246,981 | B1 | 6/2001 | Papineni et al. |
| 6,510,411 | B1 | 1/2003 | Norton et al. |
| 8,346,563 | B1 | 1/2013 | Hjelm et al. |
| 8,990,126 | B1 | 3/2015 | Bangalore et al. |

(Continued)

OTHER PUBLICATIONS

Anonymously; "Automatic Generation of Translation Test Data Using Source Repository Analysis", ip.com—http://ip.com/IPCOM/000232463D; Nov. 11, 2013; 4 pages.

(Continued)

*Primary Examiner* — Bryan S Blankenagel
(74) *Attorney, Agent, or Firm* — Cantor Colburn LLP; Rahan Uddin

(57) ABSTRACT

Embodiments of the present invention provide a system for implementing multi-turn dialogs. The system performs a method that includes receiving a series of user utterances, generating a series of responsive system utterances, and labeling the series of responsive system utterances to generate training data for training a dialog management policy. The labeling includes executing a reward function at each turn of a dialog, in which for each turn of the dialog the reward function is configured to output a reward value that is based at least in part on an accuracy of the responsive system utterance of the turn and on number of dialog turns elapsed.

13 Claims, 11 Drawing Sheets

(56) References Cited

U.S. PATENT DOCUMENTS

| | | | |
|---|---|---|---|
| 9,189,742 | B2 | 11/2015 | London |
| 2015/0363393 | A1* | 12/2015 | Williams ............. G06F 17/289 704/8 |
| 2016/0260029 | A1 | 9/2016 | Gelfenbeyn et al. |
| 2016/0342702 | A1 | 11/2016 | Barve et al. |
| 2017/0060839 | A1* | 3/2017 | Kawamura ............. G10L 25/63 |
| 2017/0337478 | A1* | 11/2017 | Sarikaya ................. G06F 3/167 |
| 2018/0060301 | A1* | 3/2018 | Li ....................... G06F 17/2775 |
| 2018/0137854 | A1* | 5/2018 | Perez ..................... G10L 15/16 |
| 2018/0189267 | A1* | 7/2018 | Takiel .................. G06F 17/271 |
| 2018/0196850 | A1* | 7/2018 | Schaeffer .......... G06F 17/30463 |

OTHER PUBLICATIONS

Anonymously; "System and Method for Question Selection of Dialog System"; ip.com—http://ip.com/IPCOM/000237777D; Jul. 10, 2014; 3 pages.

Anonymously; "System for Visualizing and Influencing the Determining Factors for Answers from a Cognitive Question and Answer System"; ip.com—http://ip.com/IPCOM/000247267D; Aug. 18, 2016; 7 pages.

Mell et al.; "The NIST Definition of Cloud Computing—Recommendations of the National Institute of Standards and Technology"; U.S. Department of Commerce; Sep. 2011; 7 pages.

Taboada, Maite; "Modeling Task-Oriented Dialogue"; Computers and the Humanities 37; Netherlands, 2003; pp. 431-454.

Dhingra et al.; "Towards End-to-End Reinforcement Learning of Dialogue Agents for Information Access"; arXiv:1609.00777v3 [cs.CL]; Apr. 20, 2017; 12 pages.

Henderson; "Machine Learning for Dialog State Tracking: A Review"; Proceedings of the First International Workshop on Machine Learning in Spoken Language Processing (2015); 8 pages.

Popescu et al.; "Towards a Theory of Natural Language Interfaces to Databases"; IUI'03—Miami, Florida; Jan. 12-15, 2003; 9 pages.

Su et al.; "Continuously Learning Neural Dialogue Management"; arXiv:1606.02689v1 [cs.CL]; Jun. 8, 2016; 6 pages.

Zettlemoyer et al.; "Learning Context-Dependent Mappings from Sentences to Logical Form"; Proceedings of the 47th Annual Meeting of the ACL and the 4th IJCNLP of the AFNLP-Suntec, Singapore, Aug. 2-7, 2009; 9 pages.

Zhao et al.; "Towards End-to-End Learning for Dialog State Tracking and Management using Deep Reinforcement Learning"; arXiv:1606.02560v2 [cs.AI]; Sep. 15, 2016; 10 pages.

* cited by examiner

| Role | Example | DB Choice | Slot Choice |
|---|---|---|---|
| U | Which players played in Mercedes-Benz championship? | | |
| S | There are too many results. Please suggest a feature to narrow or limit size. | Players, Tournaments, Stats | DB Ids (3) |
| U | Which features are available? | | |
| S | Year, Place and Money are top discriminating features. | Players, Tournaments, Stats | DB Ids (3), Stats.Year, Players.Place, Players.Money |
| U | Given me first 100 players of latest year. | | |
| S | Assuming latest year (2007), the first 100 players are ... Do you want more? | Players, Tournaments, Stats | DB Ids (3), Stats.year |
| U | Thanks. I am done. | | |

FIG. 5

| sid | tid | ed | p_t | no | place | tie | pid | to_par | score | first | second | third | fourth | fifth | money | pounds | euros | rds | cuts | top |
|---|---|---|---|---|---|---|---|---|---|---|---|---|---|---|---|---|---|---|---|---|
| 835597 | 242015 | 2473.25 | 0 | 64 | YES | 10241 | 13 | 293 | 69 | 74 | 77 | 73 | 0 | 23822.0 | 15403.81 | 21307.31 | 4 | 1 |
| 835598 | 242015 | 2476.5 | 0 | 100 | CUT | 8027 | 13 | 153 | 72 | 81 | 0 | 0 | 0 | 0.0 | 2586.48 | 3577.75 | 2 | 0 | 0 |
| 835599 | 242015 | 2475.5 | 0 | 100 | CUT | 19236 | 11 | 151 | 74 | 77 | 0 | 0 | 0 | 0.0 | 2586.48 | 3577.75 | 2 | 0 | 0 |
| 835650 | 242015 | 2471.75 | 0 | 42 | YES | 6568 | 7 | 287 | 71 | 73 | 73 | 70 | 0 | 42946.0 | 27769.8 | 38412.1 | 4 | 1 |
| 835600 | 242015 | 2473 | 0 | 100 | CUT | 34666 | 6 | 146 | 68 | 78 | 0 | 0 | 0 | 0.0 | 2586.48 | 3577.75 | 2 | 0 | 0 |
| 835601 | 242015 | 2471.75 | 0 | 42 | YES | 34387 | 7 | 287 | 74 | 70 | 73 | 70 | 0 | 42946.0 | 27769.8 | 38412.1 | 4 | 1 |
| 835602 | 242015 | 2473.5 | 0 | 100 | CUT | 34856 | 7 | 147 | 70 | 77 | 0 | 0 | 0 | 0.0 | 2586.48 | 3577.75 | 2 | 0 | 0 |
| 835603 | 242015 | 2469 | 0 | 2 | YES | 3659 | -4 | 276 | 65 | 71 | 70 | 70 | 0 | 877144.0 | 567180.06 | 784551.25 | 4 | 1 |
| 835604 | 242015 | 2470.25 | 0 | 12 | YES | 8892 | 1 | 281 | 67 | 73 | 72 | 69 | 0 | 192925.0 | 124749.43 | 172559.52 | 4 | 1 |

DIALOG AGENT FOR CONDUCTING TASK-ORIENTED COMPUTER-BASED COMMUNICATIONS

BACKGROUND

The present invention generally relates to computer-based communications systems, and more specifically, to the use of dialog agents or conversational agents to conduct task-oriented computer-based communications.

A dialog system/agent or a conversational system/agent (CA) is a computer system intended to converse with a human in a structured manner. Dialog systems have employed text, speech, graphics, haptics, gestures and other modes for communication on both the input and output channel. Task-oriented dialog systems generally provide a computer-based interface for explaining information in a repository (e.g., database) to a user via a "dialog" that is conducted between the system and the user. Some example dialog systems include chat systems, spoken dialog systems, chat agents, digital personal assistants, and automated online assistants.

SUMMARY

Embodiments of the present invention provide a system for implementing multi-turn dialogs. The system is configured to perform a method. A non-limiting example method includes receiving a series of user utterances. The method generates a series of responsive system utterances based at least in part on a predetermined dialog management policy and on information retrieved from multiple tables of a database. Each system utterance of the series of responsive system utterances is responsive to a different user utterance of the series of user utterances. A dialog includes a number of dialog turns, in which each dialog turn includes a respective pair of user and responsive system utterances. The method labels the series of responsive system utterances to generate training data for training a second dialog management policy. The process can be one-shot or iterative: whenever a new dataset is generated, it can be incorporated into old training data for training a new dialog management policy. The labeling includes executing a reward function and tracking the belief states (user intention, dialog acts) at each turn of the dialog, in which for each turn of the dialog, the reward function is configured to output a reward value that is based at least in part on an accuracy of the responsive system utterance of the turn and on number of dialog turns elapsed.

Embodiments of the present invention provide a computer-implemented method for implementing multi-turn dialogs via retrieval of information from multiple tables of a database. A non-limiting example of the computer-implemented method includes receiving as inputs, an upper limit of dialog turns and training data, in which the training data includes a series of user utterances for a dialog and a series of responsive system utterances for the dialog. Each system utterance of the series of responsive system utterances is responsive to a different user utterance of the series of user utterances. A dialog includes a number of turns, in which each turn includes a respective pair of user and responsive system utterances. The computer-implemented method trains a dialog management policy of a dialog manager based at least in part on the received inputs and on a reward function measured at each turn of the dialog. The reward function is configured to output a reward value for each turn of the dialog that is based at least in part on an accuracy of the responsive system utterance of the turn and on number of dialog turns elapsed.

Embodiments of the invention provide a computer program product for implementing a multi-turn dialog, the computer program product comprising a computer readable storage medium having program instructions embodied therewith. The program instructions are executable by a processor to cause the processor to perform a method. A non-limiting example of the method includes receiving a series of user utterances. The method generates a series of responsive system utterances based at least in part on a trained dialog management policy and on information retrieved from multiple tables of a database. Each system utterance of the series of responsive system utterances is responsive to a different user utterance of the series of user utterances. A dialog includes a number of turns, in which each turn includes a respective pair of user and responsive system utterances. The trained dialog management policy was trained based at least in part on executing a reward function at each turn of a prior dialog, in which for each turn of the prior dialog the reward function is configured to output a reward value that is based at least in part on an accuracy of a responsive system utterance of the turn and on number of dialog turns elapsed.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 5 depicts an exemplary dialog in accordance with one or more embodiments of the present invention;

FIG. 9 depicts an exemplary table of a database for a particular domain in accordance with one or more embodiments of the present invention;

Figure 1:
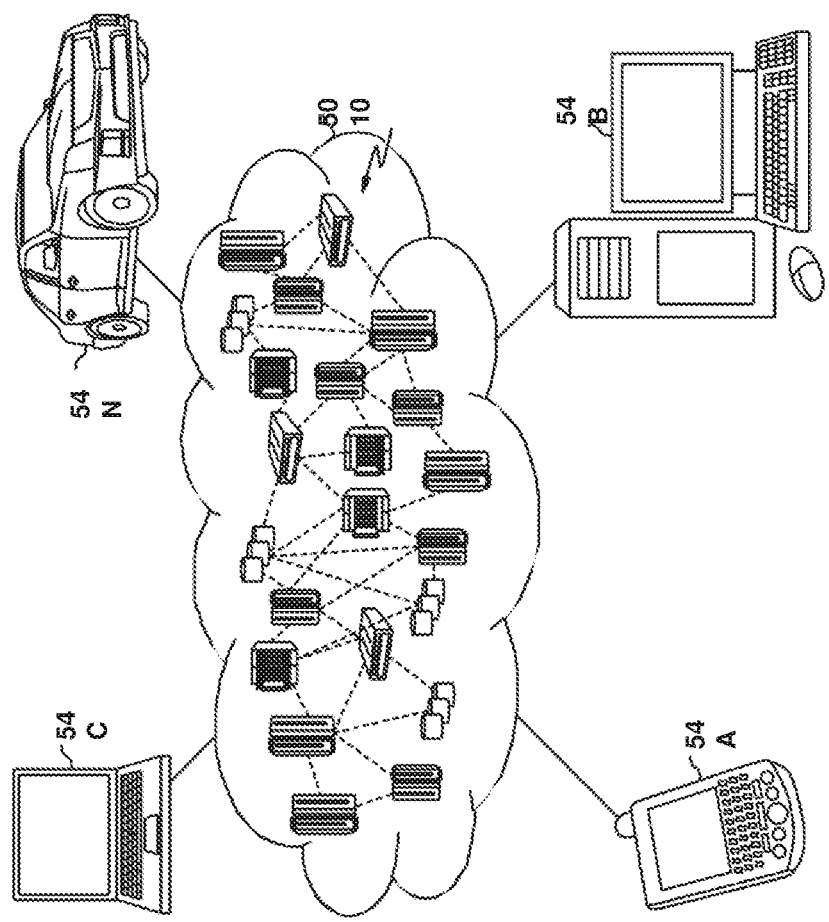
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, a process, a method, an article, or an apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
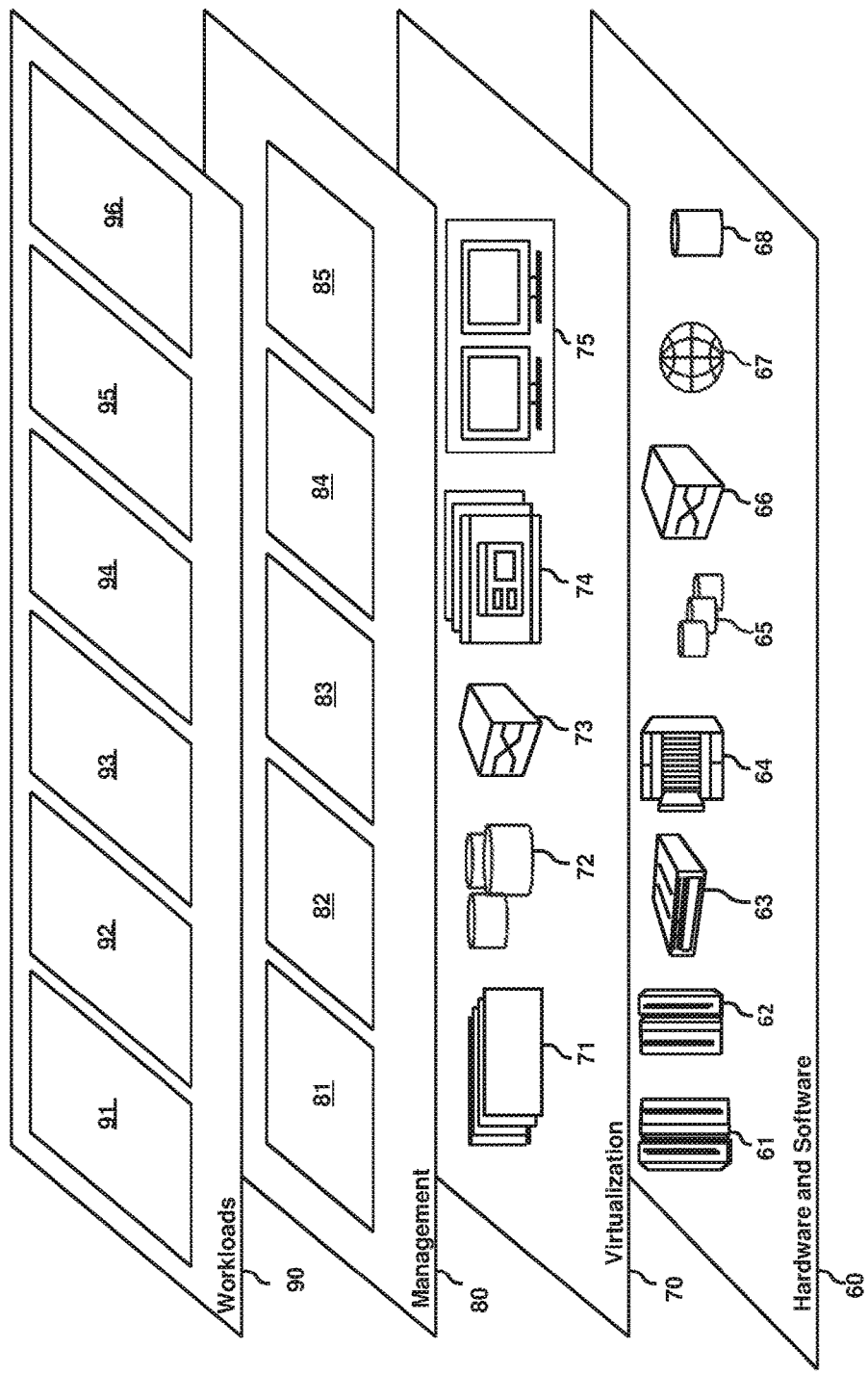
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and task-oriented dialog processing 96.

Turning now to an overview of technologies that are more specifically relevant to aspects of the invention, conventional task-oriented dialog systems have been known to utilize an explicit ruleset for determining what answers to provide to a user. Such known systems detrimentally require the user to have knowledge of the underlying scheme of the database as well as knowledge of the query language employed by the database in order to request the system to retrieve relevant data. The systems passively accept the user driven queries and then slowly return a large set of solutions.

Turning now to an overview of the aspects of the invention, one or more embodiments of the invention address the above-described shortcomings of the prior art by providing a dialog handler that makes information accessible via natural interaction modality of dialogs via querying of a repository (e.g., database) includes metadata. The dialog handler utilizes a reinforced matching learning process that implements a reward function, which is measured on a per turn basis. The reward function is configured to output a reward value that is based at least in part on an accuracy of a responsive system utterance of the given turn and on number of dialog turns elapsed.

Examples of technical improvements provided by one or more aspects of the invention to address the above-described problems include providing a strong feedback mechanism for end-to-end machine learning of a dialog management policy via utilizing a reward function that is calculated at each turn of the dialog. Per-turn rewards provide a direct, fine-grained, timely reward as soon as an action happens.

As used herein, the phrase "user utterance" broadly describes an input from a user specific to a domain for which the user wants to gain information. The phrase "utterance" refers to a sequence of one or more words. The phrase "series of utterances" refers to a plurality of utterances. The phrase "dialog" refers to a set of one or more user utterances and one or more responsive system utterances, in which pairs of user and responsive system utterances includes a turn of the dialog, in which the dialog includes a number of dialog turns.

Figure 3:
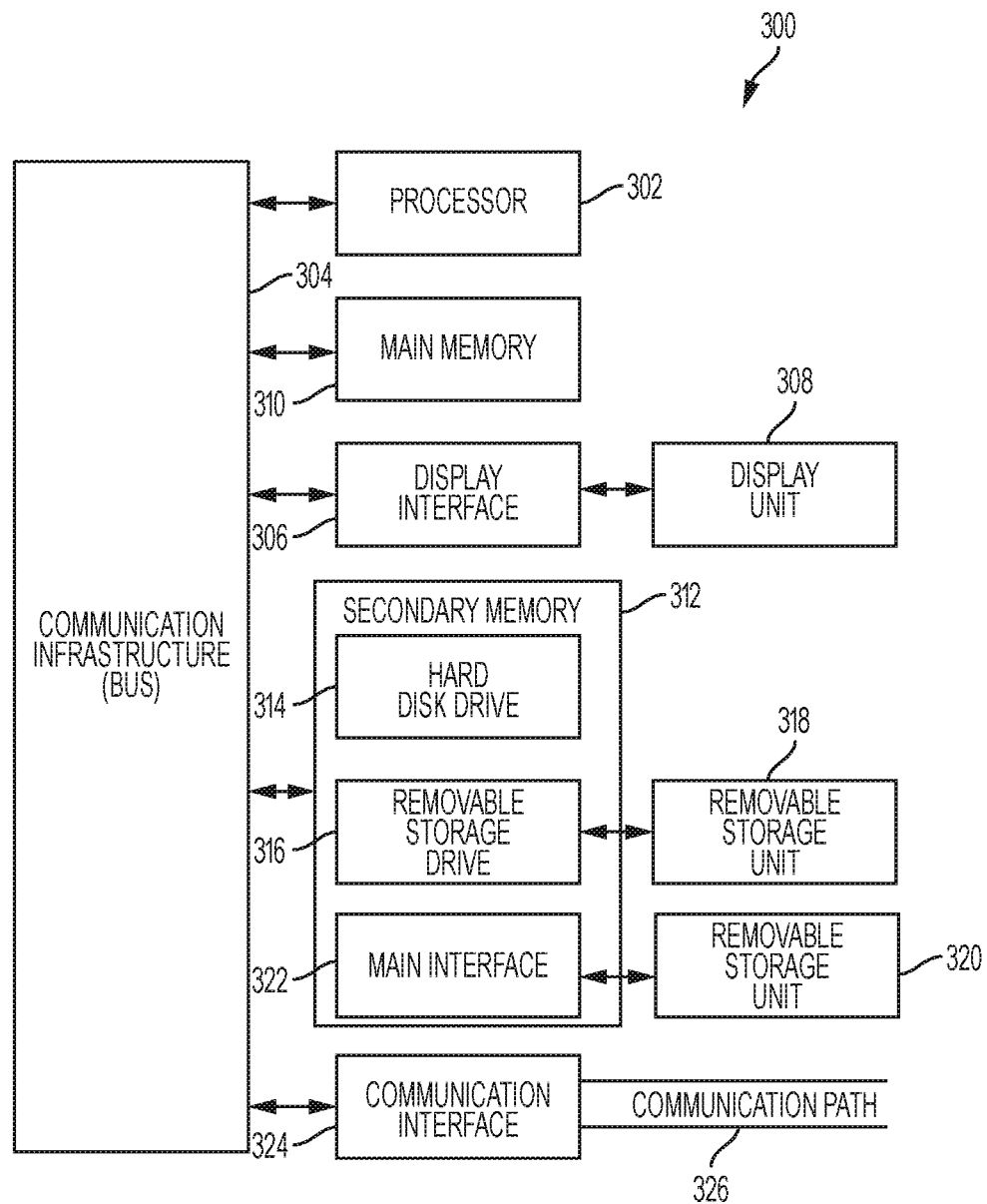
FIG. 3 depicts an exemplary computer system capable of implementing one or more embodiments of the present invention.

Turning now to a more detailed description of the present disclosure, FIG. 3 illustrates a high level block diagram showing an example of a computer-based system 300 useful for implementing one or more embodiments of the invention. Although one exemplary computer system 300 is shown, computer system 300 includes a communication path 326, which connects computer system 300 to additional systems and may include one or more wide area networks (WANs) and/or local area networks (LANs) such as the internet, intranet(s), and/or wireless communication network(s). Computer system 300 and additional system are in communication via communication path 326, (e.g., to communicate data between them).

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, removable storage unit 318 includes a computer readable medium having stored therein computer software and/or data.

In some alternative embodiments of the invention, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM or PROM) and associated socket, and other removable storage units 320 and interfaces 322 that allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etcetera. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310, and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

Figure 4:
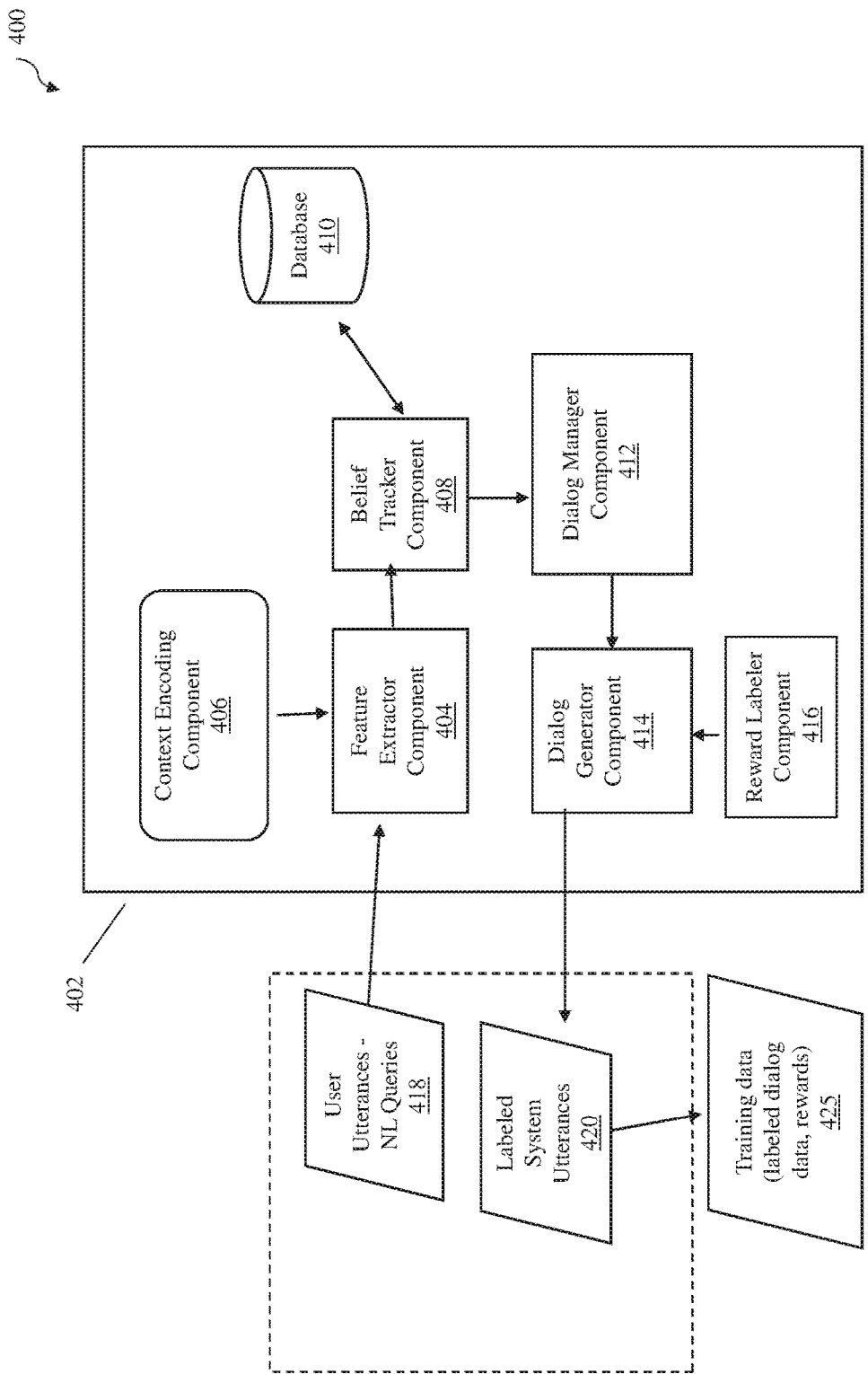
FIG. 4 depicts an exemplary system for handling multi-turn dialogs and machine learning, in which training data is generated to train a dialog management policy in accordance with one or more embodiments of the present invention.

FIG. 4 illustrates a block diagram of an example system 400 that is configured to facilitate dialog handing of multi-turn dialogs and machine learning in accordance with one or more embodiments of the present invention. In the embodiment shown in FIG. 4, system 400 is configured to generate training data for training a dialog management policy of a task-oriented dialog system by receiving user utterances for a dialog, generating responsive system utterances for the dialog, and labeling training data. The labeling is based at least in part on a reward function measured at each turn in a dialog, in which the reward function takes into account both the accuracy of the system utterance that was generated at a given turn and the number of turns currently elapsed.

Examples of the problems addressed by system 400, which embodies aspects of the invention, include the lack of a strong feedback mechanism for training a dialog management policy end-to-end as per-dialog rewards are indirect, coarse, and delayed. Accordingly, system 400 addresses the above-described problem by providing a reward on a per-turn level, in which the per-turn reward is based at least in part on the accuracy of the generated system response and on the number of turns presently elapsed. Examples of technical improvements provided by aspects of the invention to address the above-described problems include a stronger feedback mechanism for end-to-end machine learning of a dialog management policy. In contrast with per-dialog rewards, per-turn rewards provide a direct, fine-grained, and timely reward as soon as an action happens.

System 400 is a machine learning system that can be utilized to solve a variety of technical issues (e.g., learning previously unknown functional relationships) in connection with technologies such as, but not limited to, dialog policy learning and communication technologies, feature extraction technologies, machine learning technologies, time series data technologies, data analysis technologies, data classification technologies, data clustering technologies, trajectory/journey analysis technologies, medical device technologies, collaborative filtering technologies, recommendation system technologies, signal processing technologies, word embedding technologies, topic model technologies, image processing technologies, video processing technologies, audio processing technologies, and/or other digital technologies. System 400 employs hardware and/or software to solve problems that are highly technical in nature, not abstract, and cannot be performed as a set of mental acts by a human. In certain embodiments of the invention, some or all of the processes performed by system 400 are performed by one or more specialized computers (e.g., one or more specialized processing units, a specialized computer with a dialog handler component, etc.) for carrying out defined tasks related to machine learning. In some embodiments of the invention, system 400 and/or components of the system are employed to solve new problems that arise through advancements in technologies mentioned above, employment of a reward function on a per turn basis, machine learning process, and/or computer architecture, and the like. In some embodiments of the invention, system 400 provides technical improvements to dialog handling systems, feature extracting systems, machine learning systems, artificial intelligence systems, data analysis systems, data analytics systems, data classification systems, data clustering systems, trajectory/journey analysis systems, medical device systems, collaborative filtering systems, recommendation systems, signal processing systems, word embedding systems, topic model systems, image processing systems, video processing systems, and/or other digital systems. In accordance with one or more embodiments of the invention, system 400 provides technical improvements to a central processing unit associated with a machine learning process by improving processing performance of the central processing unit, reducing computing bottlenecks of the central processing unit, improving processing efficiency of the central processing unit, and/or reducing an amount of time for the central processing unit to perform the machine learning process.

As noted above, system 400 is a machine learning system. The phrase "machine learning" broadly describes a function of an electronic system that learns from data. A machine learning system, engine, or module can include a trainable machine learning algorithm that can be trained, such as in an external cloud environment, to learn currently unknown functional relationships between inputs and outputs.

Machine learning functionality can be implemented using an artificial neural network (ANN) that has the capability to be trained to perform a currently unknown function. In machine learning and cognitive science, ANNs are a family of statistical learning models inspired by the biological neural networks of animals, and in particular the brain. ANNs can be used to estimate or approximate systems and functions that depend on a large number of inputs.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based at least in part on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was read.

In the embodiment shown in FIG. 4, system 400 includes a dialog handler component 402 that includes a feature extractor component 404, a context encoding component 406, a belief tracker component 408, a database 410, a dialog manager component 412, a dialog generator component 414, and a reward labeler component 416. In some embodiments, dialog handler component 402 constitutes machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. cause the machine(s) to perform the operations described. In some embodiments, dialog handler component 402 includes a memory that stores computer executable components and instructions. Furthermore, dialog handler component 402 in some embodiments includes a processor to facilitate execution of the instructions (e.g., computer executable components and corresponding instructions) by dialog handler component 402. As shown, feature extractor component 404, context encoding component 406, belief tracker component 408, a database 410, dialog manager component 412, dialog generator component 414, reward labeler component 416, memory and/or processor are electrically and/or communicatively coupled to one another in one or more embodiments.

In general, dialog handler component 402 is configured to understand a user's intent by parsing the user's query (e.g., a user utterance) and configured to provide accurate information that satisfies the user's goal by managing the dialog conversation with the user and searching database 410 efficiently for information pertinent to the user's intent. In one or more embodiments of the present invention, the dialog handler component 402 trains the system 400 from end-to-end, allowing error signal from the end output of the dialog system to be back propagated to raw input so that the system 400 as a whole can be jointly optimized. For example, in some embodiments of the present invention, the dialog handler component 402 trains both the belief tracker component 408 and dialog manager component 412 based on the end output of the dialog system.

In the example shown in FIG. 4, the dialog handler component 402 is configured to receive a series of user utterances 418 (e.g., natural language queries, text input, or voice input) for a dialog from a user, in which the series of user utterances 418 are specific to a domain that the user wants to gain information and repository (e.g., database 410) has the data. The dialog handler component 402 is configured to output a series of system utterances 420 for the dialog that are each responsive to a different utterance of the series of user utterances 418, each respective generated system utterance is based at least in part on a dialog management policy and on information retrieved from multiple tables of the database 410. In some embodiments of the present invention, the dialog management policy is a predetermined dialog management policy that maps belief states of a state space to actions in an action space based on a predetermined set of rules. In some embodiments of the present invention, the dialog management policy is learned over time via reinforcement machine learning.

FIG. 5 depicts an exemplary dialog 500 in accordance with one or more embodiments of the present invention. In this example, dialog 500 is between a user and a system, in which the dialog 500 includes a series of user utterances 502a, 502b, 502c, 502d and a series of system utterances 504a, 504b, 504c. In general, use of a dialog structure such as the one shown in FIG. 5 allows system 400 to accept user requests via natural usage queries for information of a given domain from a structured database. In some embodiments of the present invention, a domain includes multiple tables of a database 410 includes attributes (e.g., columns or slots), and entities (e.g., rows). In accordance with one or more embodiments of the present invention, the user need not have knowledge of underlying database schema nor need query language knowledge to obtain information from the database 410, rather the user need only knowledge of the types of attributes that are available for querying.

In the example embodiment shown in FIG. 5, the user sought to find information via dialog 500 regarding players who played in a golf tournament. In this dialog 500, the dialog handler component 402 generated responsive system utterances 504a, 504b that proactively prompt the user towards efficient queries by posing questions to the user. After narrowing down the user's query, the dialog handler component 402 generated a responsive system utterance 504c by returning information from the database 410 that answers the user's query. In this example, dialog 500 includes three dialog turns, in which 502a and 504a includes a first dialog turn, 502b and 504b includes a second dialog turn, and 502c and 504c includes a third dialog turn. Dialog 500 ended at 502d as the dialog handler component 402 identified an intent of the user to terminate the dialog and thus a responsive system utterance was not generated. In some embodiments of the present invention, database 410 includes multiple databases which each include one or more tables. In the example shown in FIG. 5, database 410 includes multiple databases, in which a first database is a database of golf tournaments, the second database is a database of golf players, and the third database is a database of tournament statistics. In some embodiments of the present invention, each database includes database identifiers (DB Ids), which are keys that uniquely identify an entity of the database (e.g., a row of the database). In some embodiments of the present invention, the database 410 includes a database including multiple tables. In FIG. 5, each system utterance is associated with one or more database (DB) choices, in which each system utterance is generated based at least in part by one or more associated slot choices (e.g., columns of a selected DB). For example, system utterance 504b is generated based at least in part by the third DB Ids of the players, tournaments, and statistics databases (e.g., third row from each database), and invokes the year slot of the statistics database, the place and money slots of the players database.

Referring back to FIG. 4, the dialog handler component 402 includes a reward labeler component 416 that is configured to label the series of responsive system utterances 420 to generate training data 425 for training a dialog management policy of the dialog manager component 412 and a belief state policy of the belief tracker component 408. In some embodiments of the present invention, the dialog management policy is an updating version of the predetermined dialog management policy that is learned through machine learning. In some embodiments of the present invention, the dialog management policy is separate and distinct policy from the predetermined dialog management policy. The labeling includes executing a reward function (e.g., reward labeler component 416) at each given turn of the dialog. In general, the reward function is a function of state and action at each turn and covers correctness of answers and number of turns elapsed. For example, in some embodiments of the invention, the reward function is configured to output a reward value for each given turn of the dialog, in which the output of the reward function is based at least in part on an accuracy of a responsive system utterance of the given turn and on the number of dialog turns that have elapsed. In some embodiments of the present invention, the reward function can be represented in the following manner:

$$R(s, a) = \begin{cases} 1 - \dfrac{r-1}{R} & \text{if user target is in top} R = 5 \text{results returned by agent} \\ -1 & \text{for failed dialog} \\ -0.1 & \text{for each step} \end{cases}$$

where r is the rank of correct answer. In other words, in some embodiments of the present invention, the reward function returns a value of −0.1 for each turn that does not return an answer. For example, consider a dialog comprising two turns in which the dialog provides an incorrect answer at the second turn. At turn one of the example two-turn dialog, the reward function would return a reward value of −0.1 as the dialog has not yet failed. At turn two of the example two-turn dialog, the reward function would return a value of (−0.1)+(−1) as an incorrect answer was provided. In another embodiment, a discount factor, γ between 0 and 1, is multiplied to rewards of turns>1. Hence, the accumulative reward is (−0.1)+(−1γ)=−0.1−γ. In some embodiments of the present invention, the dialog fails if a maximum number of dialog turns have been exceeded or if the user has desired an intent to terminate the dialog. If the system utterance provided by the dialog handler 402 returns an answer to the user's query (e.g., "user target"), and if the answer is within the top R number of results that have been previously provided by an human agent (e.g., top 5, top 10, top 15, top 20, etc.), then the output value of the reward function would be inversely proportional to the rank r of the answer (e.g., 1−((r−1)/R)). For example, if the number of top results includes five ranks (R), and if the returned system response provides an answer at the second turn that is rank two (r), then the return value of the reward function at the second turn would be 0.8. The objective of labeling the training data via the reward function is to allow system 400 to train the dialog management policy using machine learning that is based at least in part on maximizing the averaged sum of discounted rewards for each given state. Mathematically, the maximization of the average sum of the discounted reports can be expressed as $V(s_0)=E[\Sigma_t^T \gamma^t r_t | s_0]$, in which E denotes the expectation, which is a weighted average over instances, and $\gamma^t$ is a discount of the reward value. E is the average over multiple trajectories, in which a trajectory is some action and reward. The summation is conditional on a given state, in which $S_0$ denotes the initial state of the dialog and the value returned by the equation is based on the output of the reward function.

Figure 6:
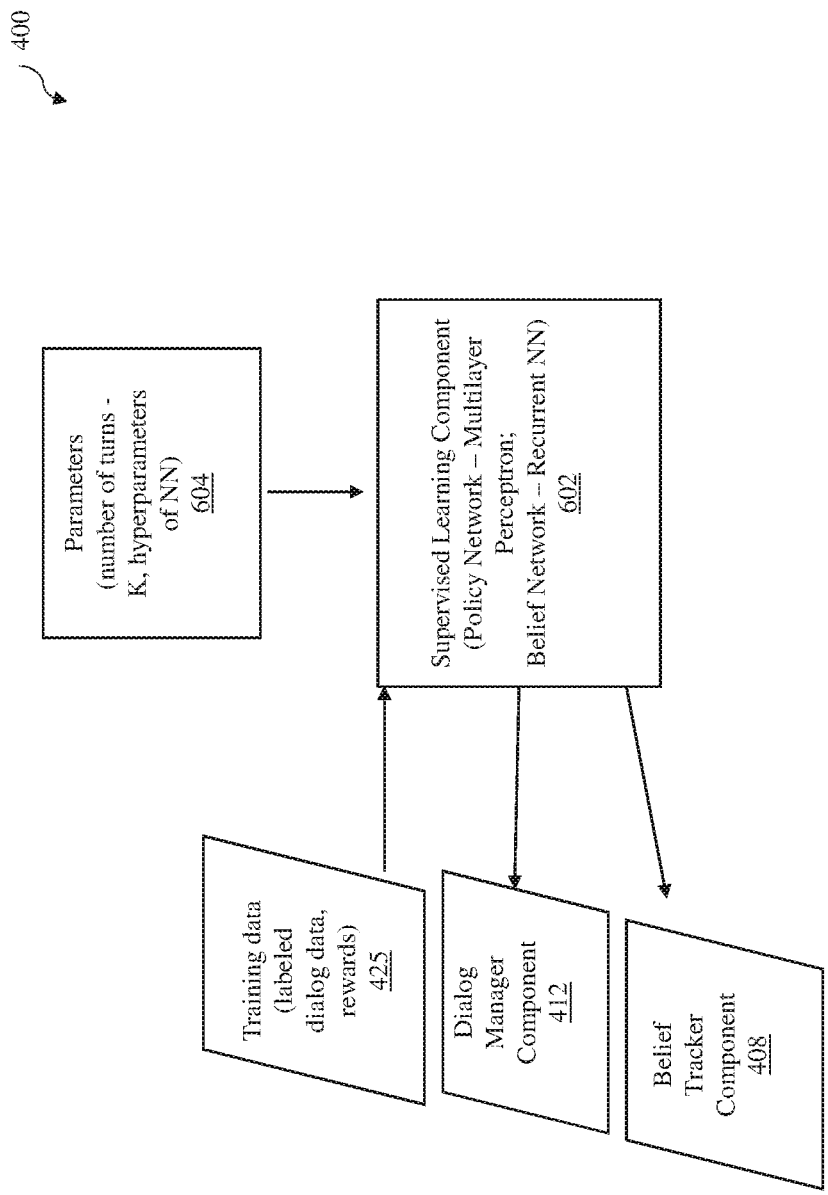
FIG. 6 depicts an exemplary supervised learning component of the system of FIG. 4, in which a dialog manager component and belief tracker component are trained via the supervised learning component in accordance with one or more embodiments of the present invention.

FIG. 6 depicts an exemplary supervised learning component 602 of system 400 of FIG. 4, in which the dialog manager component 412 and belief tracker component 408 are trained via the supervised learning component 602 in accordance with one or more embodiments of the present invention. In particular, in some embodiments of the present invention system 400 is configured to utilize training data 425 to train a dialog management policy of the dialog manager component 412 and train a belief policy of the belief tracker component 408 via the supervised learning component 602. The supervised learning component 602 is configured to implement one or more neural networks. For example, in some embodiments of the present invention, the supervised learning component 602 implements a policy network such as a multilayer perceptron network. In some embodiments of the present invention, the supervised learning component 602 implements a belief network (e.g., a recurrent neural network). In some embodiments of the present invention, the supervised learning component 602 implements both a policy network and a belief network. In some embodiments of the present invention, the supervised learning component 602 can be represented using a variety of suitable techniques, such as for example, multilayer perceptron (MLP) representation, gated recurrent unit (GRU) representation, long-short term memory (LSTM) representation, and/or a memory network representation. In some embodiments of the present invention, learning methods employed by the supervised learning component 602 include Q learning, state-action-reward-state-action (SARSA) learning, and/or policy gradient learning.

In accordance with one or more embodiments of the present invention, the supervised learning component 602 is configured to receive as inputs training data 425 and a set of predetermined parameters 604, and is configured to train the dialog manager component 412 and the belief tracker component 408 based at least in part on the training data 425 and on the set of predetermined parameters 604. The set of predetermined parameters 604 can include, for example an upper limit of dialog turns (K). The upper limit of dialog turns (K) represents the maximum number of turns that a dialog may have before the dialog handler component 402 terminates the dialog. The set of predetermined parameters 604 can include further parameters, such as for example, hyperparameters of a neural network.

Figure 7:
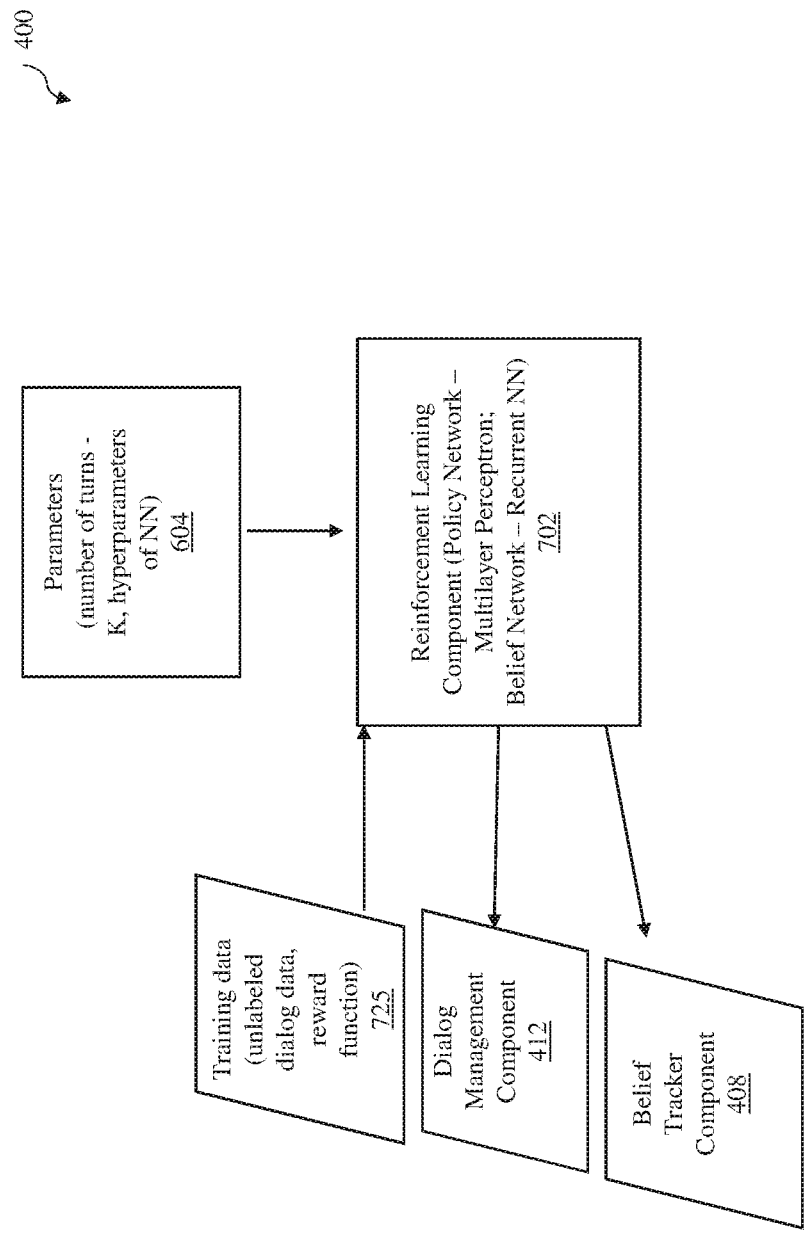
FIG. 7 depicts an exemplary reinforcement learning component of the system of FIG. 4, in which a dialog manager component and belief tracker component are trained via the reinforcement learning component in accordance with one or more embodiments of the present invention.

FIG. 7 depicts an exemplary reinforcement learning component of system 400 of FIG. 4, in which a dialog manager component and belief tracker component are trained via the reinforcement learning component in accordance with one or more embodiments of the present invention. In particular, in some embodiments of the present invention system 400 is configured to utilize training data 725 to train a dialog management policy of the dialog manager component 412 and train a belief policy of the belief tracker component 408 reinforcement learning component 702. Training data 725 is similar to training data 425, except training data 725 does not include labeled dialog data (e.g., not labeled via the reward label component 414). In some embodiments of the present invention, the training data 725 includes the reward function itself. In some embodiments of the present invention, system 400 is configured to receive the unlabeled training data 725 and the set of parameters 604, and then utilize the reward function to train, from end-to-end, both the dialog management policy of the dialog manager component 412 and the belief policy of the belief tracker component 408 via the reinforcement learning component 702.

The reinforcement learning component 702 is configured to implement one or more neural networks For example, in some embodiments of the present invention, the reinforcement learning component 702 implements a policy network such as a multilayer perceptron network. In some embodiments of the present invention, the supervised reinforcement component 702 implements a belief network, such as for example, a recurrent neural network. In some embodiments of the present invention, the reinforcement learning component 702 implements both a policy network and a belief network. In some embodiments of the present invention, the reinforcement learning component 702 can include various representations, such as for example, multilayer perceptron (MLP) representation, gated recurrent unit (GRU) representation, long-short term memory (LSTM) representation, and/or a memory network representation. In some embodiments of the present invention, learning methods employed by the reinforcement learning component 706 include Q learning, state-action-reward-state-action (SARSA) learning, and/or policy gradient learning. In some embodiments of the present invention, exploration strategies employed by the reinforcement learning component 706 include e-greedy strategies, soft-max strategies, and/or upper confidence bound applied to trees (UCT) strategies.

Referring back to FIG. 4, feature extractor component 404 is configured to receive a user utterance and extract a feature vector from the received user utterance. In some embodiment of the invention, if the user utterance is provided via audio, the feature extract component 404 is configured to translate the user utterance into text and to extract a feature vector from the text. In some embodiments of the invention, if the user utterance is provided via audio, the feature extract component 404 is configured to extract a feature vector directly from the audio content of the user utterance. In some embodiments of the invention, the feature extractor component 404 includes an automatic speech recognition that includes one or more recognition engines such as pattern-based speech recognizers. In some embodiments of the invention, the feature extractor component 404 includes a natural language processing (NLP) engine for understanding spoken language from the received utterances.

The context encoding component 406 is configured to generate or import encoded dialog history regarding one or more prior user utterances of the particular dialog. For example, if the utterance that is presently being analyzed by the dialog handler component 402 is a second utterance of a given dialog, then history pertaining the first utterance of the dialog can be used by the context component 406 to generate encoded dialog history. In other words, in some embodiments of the present invention, a context is provided that encodes the current user utterance and the history of user-system utterances. In some embodiments of the present invention, the encoding of both the current user utterance and the history of user-system utterances is provided by an output of the belief tracker component 408. In some embodiments of the present invention, the context encoding component 406 or functions performed by the context encoding component 406 are integrated within the feature extractor component 404.

The belief tracker component 408 is configured to identify what table(s) of the database and what column(s) of the tables of the database are being implicated by the user's utterance. In particular, belief tracker component 408 implements a neural network (e.g., a recurrent neural network) that is configured to map dialog history to belief states. A belief state is a distribution over user goals and dialog states (e.g., context). The output of the belief tracker is an encoding of both the current user utterance and the history of utterances of user-system utterances. The user goal is related to: one or more tables of the database and their respective columns of metadata, such as names and data types; and vocabulary of columns (e.g., slots). The belief tracker component is configured to receive the feature vector as an input from the feature extractor component 404, concatenate the feature vector with the encoded dialog history that was generated by the context encoding component 406, and produce a probability distribution vector over the columns of the multiple tables of the database 410.

The dialog manager component 412 is configured to receive the output probability distribution vector, select an action from an action space based at least in part on a dialog management policy, and provide the selected action to a dialog generator. The dialog management policy maps belief states of a state space to actions of an action space. In some embodiments of the invention, the dialog management policy is a predetermined policy which is updated over time via machine learning (e.g., supervised learning component 602 and/or reinforcement learning component 702).

Figure 8:
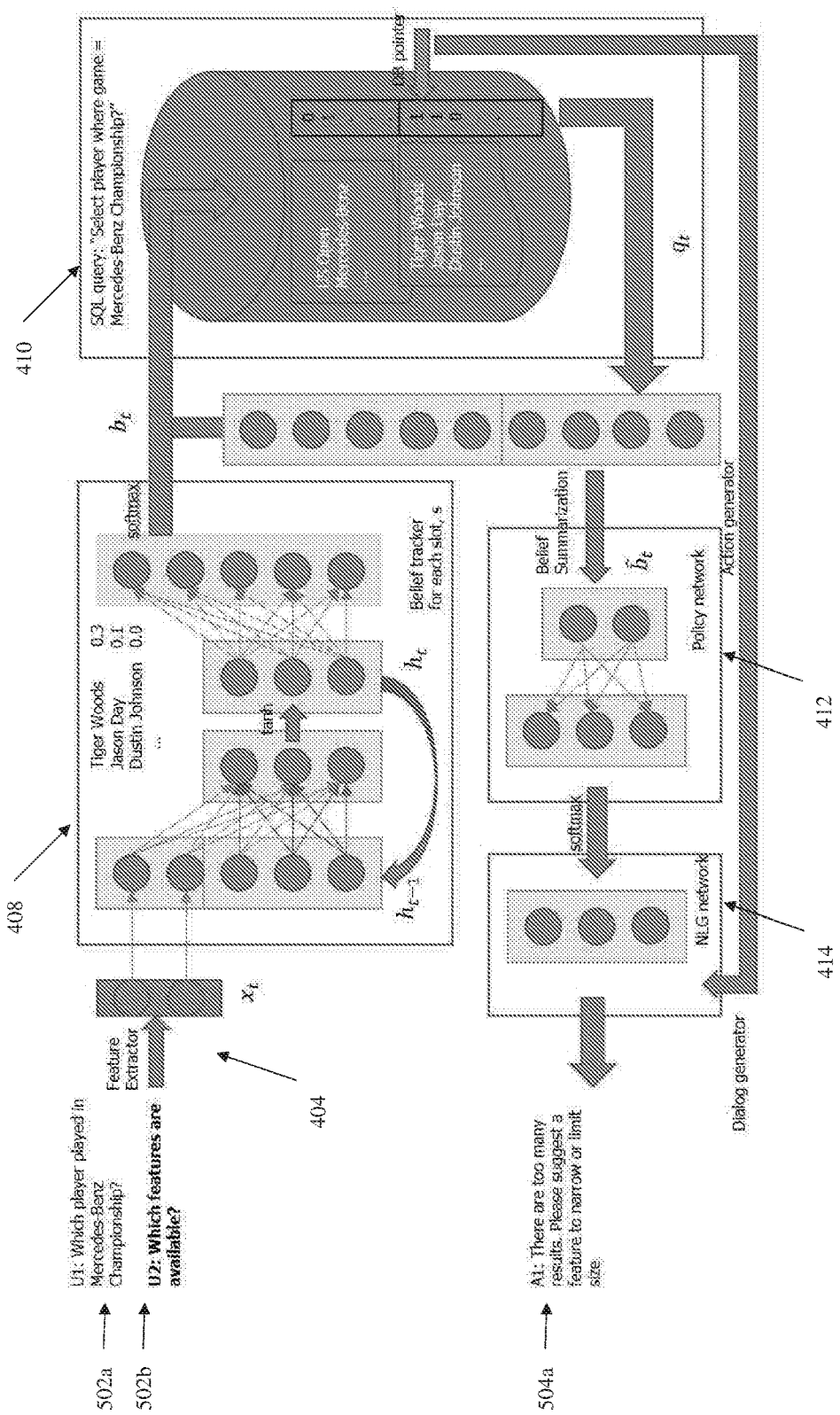
FIG. 8 depicts a detailed view of the exemplary system of FIG. 4 in accordance with one or more embodiments of the present invention.

FIG. 8 show a detailed view of a subset of the components of system 400 as they are implemented in the context of dialog 500. In particular, FIG. 8 shows details regarding the feature extractor component 404, belief tracker component 408, database 410, dialog manager component 412, and dialog generator component 416.

As shown in FIG. 8, in some embodiments of the invention, the feature extraction component utilizes a bigram method that converts a user utterance $u_t$ into a vector representation $x_t \in V^n$, where $V^n$ is an n-gram dictionary. The output of the feature extractor component is a feature vector $x_t$ that represents the present observation of the given user utterance to the system 400. In some embodiments of the invention, the belief tracker component 404 is a neural network that includes a plurality of layers. In some embodiments of the present invention, the plurality of layers includes one or more hidden layers and an output layer. In some embodiments of the present invention, at least one of the hidden layers are configured to exploit tan h non-linearities. In some embodiments of the present invention, at least one hidden layer exploits a rectified linear unit non-linearity. In some embodiments of the present invention, the output layer includes one or more softmax partitions.

The belief tracker component 408 receives the feature vector $x_t$ and the dialog history of the current dialog (e.g., encoded by $h_t-1$, which is a hidden vector) and outputs for each slot a probability distribution vector over the columns of the tables of the database. This can be represented mathematically as $b^t=[p_1^t, \ldots, p_M^t, q_1^t, \ldots, q_M^t, p_T^t]$, in which $p_j^t(v)$ is the slot (e.g., column) distribution at turn t, $v \in V_j$, $p_T^t(i)$ is the probability distribution of a posterior user being interest in row i, $q_j^t$ is a Bernoulli distribution over user not knowing value of slot j, M is the maximum columns of tables of the database, and N is the maximum number of rows in the tables of database 410. As noted above, in some embodiments of the present invention, the belief tracker can be implemented using certain methods such as GRU. Thus, in some embodiments of the present invention, the mathematical formula will yield that $b^t$=GRU $(x^t, b^{t-1})$.

The vector output by the belief tracker component can be very large depending on the number of columns and number of vocabularies for each column. In some embodiments of the present invention, belief summation is employed to compact the belief vector into a shorter, more compressed representation of the information, which is denoted in FIG.

8 as vector $\hat{b}_t$. In some embodiments of the present invention, vector $\hat{b}_t$ is generated via one or more softmax partitions, in which the softmax partitions normalize the probability distribution from the output of the belief tracker 408. In some embodiments of the present invention, belief summation occurs before and/or after the dialog manger component 412 invokes the policy network.

FIG. 9 depicts an exemplary table 900 of a database 410 for a particular domain in accordance with one or more embodiments of the present invention. In the example shown, slots/columns are depicted across the top of table 900 and entities/rows are depicted along the side.

Referring back to FIG. 8, in some embodiments of the invention, the action space of the dialog management policy of the dialog manager component 412 includes an inform action, a feature recommendation action, a query action, a welcome action, and a disambiguate action. The inform action returns an answer from the database, the feature recommendation provides details regarding attributes from the tables, the query action queries the database, the disambiguate action asks a question to the user to disambiguate the user query, and the welcome action generates a welcome message to be sent to the user. In some embodiments of the present invention, an inform action of the action space inform (I) informs the user with an order list of results I from the tables of the database 410. A query database action can include a hard knowledge base (database) lookup, in which $$q_t = U_{s' \in S_I} \mathrm{argmax}_v p_{s'}^t.$$

In some embodiments of the present invention, an SQL query is used by the dialog manager component 412 to perform the lookup. In some embodiments of the present invention, a welcome or disambiguate action of the action spaces includes a request, such as, request (slot=i) for $1 \leq j \leq M$, in which the user is asked for a value a value of slot i of the database 410.

The dialog generator component 414 is configured to generate a system utterance that is responsive to the received user utterance, wherein the system utterance is based at least in part on the selected action and on the information retrieved from the database 410 by the dialog manager component 412. In some embodiments of the invention, generating the system utterance includes generating a natural language response using NLP processing. In some embodiments, the dialog generator component 414 includes a natural language generator (NLG) network that generates natural language based on the action selected from the policy network of the dialog manager component 412 and information retrieved from database 410. The NLG network can be rule based or be learned through machine learning.

Referring back to FIG. 4, in some embodiments of the present invention, the reward function (e.g., the reward labeler component 416) incorporates a dialog complexity estimator, in which the complexity estimator is configured to calculate a query cost $d_T$ associated with querying the database at each turn. The dialog complexity estimator is a function of a pair of user and system utterances, and size of data revised from the tables of a database 410. For example, in some embodiments of the present invention, the query cost value returned by the function for a single table of the database is $d_T=(m \times n)/(M \times N)$, in which m is the number of columns invoked by the given query and n is the number of rows invoked by the given query, and in which $0 \leq d_T \leq 1$ for each turn T. In some embodiments of the present invention, the average dialog complexity value provided by the dialog complexity estimator for a dialog with K number of turns is $\bar{d}_T = 1/K \Sigma_{k=1}^{K} (m_k \times n_k)/(M \times N)$. In some embodiments of the present invention, if the database includes multiple tables, the dialog handler component 402 is configured to obtain a product of the table complexity averages (e.g., multiply together the averages of the corresponding tables).

In some embodiments of the present invention, the reward function incorporates the dialog complexity estimator implicitly. For example, in some embodiments of the present invention, the reward function incorporates the dialog complexity estimator by at least augmenting a state space S of the dialog management policy with another dimension that corresponds to the returned value of the dialog query complexity return value $d_T$, in which $d_T \in D$, where $D=[0, 1]$. The dialog management policy is defined over the new state space $S'=S \times D$. As such, in some embodiments of the present invention, if the dialog management policy is a predetermined dialog policy, the predetermined dialog policy is redefined over the augment state space. In some embodiments, the policy is defined over the new state space such that if the query complexity $d_T$ is greater than some threshold dialog complexity value, the dialog handler component 402 would be configured to not query the database but rather generate a system utterance that asks a clarification question to the user, whereas if the returned value of the dialog complexity estimator is less than or equal to the threshold, the dialog handler component 402 would be configured to query the database and generate a responsive system utterance based at least in part on a result of the query. In this manner, the query complexity $d_T$ controls the maximum number of turns allowed before termination of the dialog, which implicitly determines the amount of reward/penalty to be accrued.

In some embodiments of the present invention, the reward function incorporates the dialog complexity estimator explicitly by modifying the reward function. For example, in some embodiments of the present invention, the reward function modifies the reward function by at least subtracting the output of the reward function by a function of the return value of the dialog complexity estimator. This can be expressed mathematically by, for example, $R'(s, a)=R(s, a)-f(d_T)$, in which $f(d_T)$ is the function of the return value of the complexity estimator at a given turn T. The function of the return value of the complexity estimator $f(d_T)$ can be any suitable real function that is commensurate with $R(s,a)$. In some embodiments of the present invention, the function of the return value of the complexity estimator $f(d_T)$ can be the return value itself for the given turn T (e.g., $f(d_T)=d_T$).

In some embodiments of the present invention the reward function incorporates the dialog complexity estimator in a hybrid manner by combining both the explicit and implicit functionality identified above. In some embodiments of the present invention, the hybrid approach includes augmenting a state space of the dialog management policy to include an additional dimension that corresponds to the returned value, and then modifying the reward function by specifying the reward function over the augmented state space and subtracting the output of the reward function by a function of the return value of the dialog complexity estimator. Specifying the reward over the augmented state-space in the hybrid manner can be denoted mathematically as $R(s', a)=R(s', a)-f(d_T)$.

Figure 10:
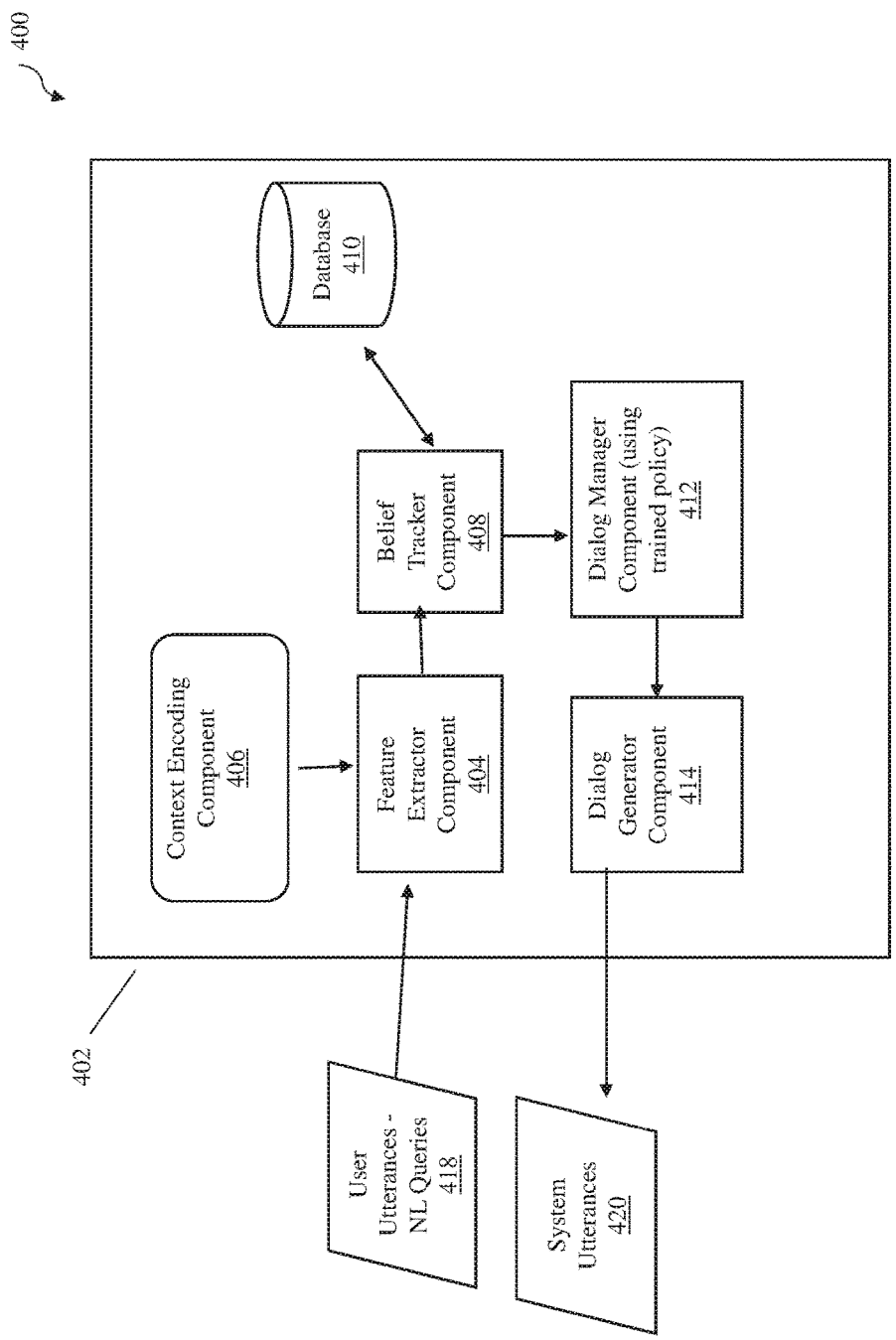
FIG. 10 depicts an exemplary system for handling multi-turn dialogs and machine learning, in which system utterances are generated based at least in part on a trained dialog management policy in accordance with one or more embodiments of the present invention.

FIG. 10 illustrates another example embodiment of system 400, in which system 400 to generate a series of system utterances 420 in real time from a series of received user utterances 418. Each system utterance of the series of system utterances 420 is generated based on a previously trained dialog management policy. In some embodiments of the present invention, the trained dialog management policy was trained based at least in part on execution of a reward function at each given turn of a prior dialog. The reward function is configured to output a reward value for each given turn of the prior dialog, in which the output is based at least in part on an accuracy of a responsive system utterance of the series of the given turn and on number of dialog turns elapsed. In some embodiments of the present invention, the reward function incorporated a dialog complexity estimator. In some embodiments of the present invention, the trained dialog management policy is updated via machine learning over time in response to the generated system utterances 420 (e.g., supervised learning component 602 and/or reinforcement learning component 702).

Figure 11:
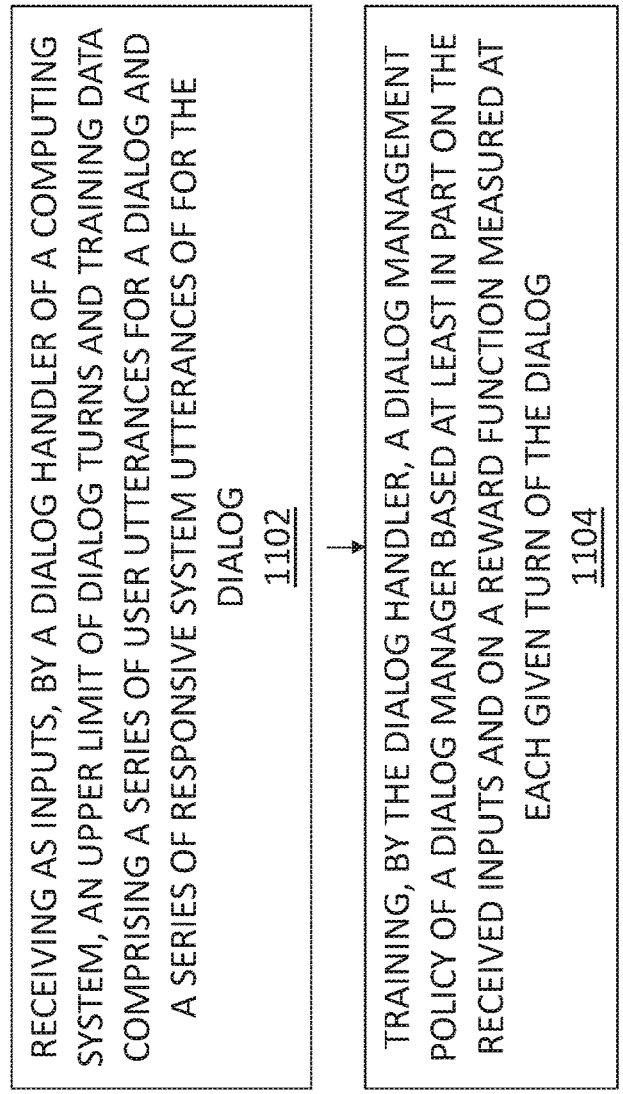
FIG. 11 depicts a flow diagram illustrating a methodology in accordance with one or more embodiments of the present invention.

Additional details of the operation of system 400 will now be described with reference to FIG. 11, wherein FIG. 11 depicts a flow diagram illustrating a methodology 1100 according to one or more embodiments of the present invention. At 1102, an upper limit of dialog turns and training data including a series of user utterances for a dialog and a series of responsive system utterances of for the dialog, are received as inputs. Each system utterance of the series of responsive system utterances is responsive to a different user utterance of the series of user utterances. The dialog includes a number of turns, and in which each turn includes a respective pair of user and responsive system utterances. At 1104, a dialog management policy of a dialog manger component is trained based at least in part on the received inputs and on a reward function measured at each given turn of the dialog. For each given turn of the dialog, the reward function is configured to output a reward value that is based at least in part on the accuracy of the responsive system utterance of the given turn and on the number of dialog turns elapsed.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A system for implementing multi-turn dialogs, wherein the system is configured to perform a method comprising:
    receiving, by a dialog handler of the system, a series of user utterances;
    generating, by the dialog handler, based at least in part on a predetermined dialog management policy and on information retrieved from multiple tables of a database for a domain, a series of responsive system utterances;
    wherein each system utterance of the series of responsive system utterances is responsive to a different user utterance of the series of user utterances;
    wherein a dialog comprises a number of dialog turns, wherein each dialog turn comprises a respective pair of user and responsive system utterances; and
    labeling, by the dialog handler, the series of responsive system utterances to generate training data for training a subsequent dialog management policy;
    wherein labeling the series of responsive system utterances includes executing a reward function at each turn of the dialog;

wherein for each turn of the dialog the reward function is configured to output a reward value that is based at least in part on an accuracy of the responsive system utterance of the turn and on the number of dialog turns elapsed;

wherein the reward function incorporates a dialog complexity estimator that is configured to calculate a query cost associated with querying the database;

wherein the dialog complexity estimator is configured to return a value of zero, one, or between zero and one; and wherein the reward function incorporates the dialog complexity estimator by at least augmenting a state space of the predetermined dialog management policy to include an additional dimension that corresponds to the returned value.

2. The system of claim 1, wherein the predetermined dialog management policy is defined over the augmented state space.

3. The system of claim 1, wherein:
the reward function incorporates the dialog complexity estimator further by at least:
modifying the reward function by specifying the reward function over the augmented state space and subtracting the output of the reward function by a function of the return value of the dialog complexity estimator.

4. The system of claim 3, wherein generating the series of responsive system utterances includes:
for each given user utterance in the series of user utterances:
executing, by the dialog handler, a feature extractor configured to extract a feature vector from the given user utterance;
executing, by the dialog handler, a belief tracker configured to receive the feature vector as an input, concatenate the feature vector with encoded dialog history, and output a probability distribution vector over columns of the multiple tables of the database, wherein the output is based at least in part on the received feature vector; and
executing, by the dialog handler, a dialog manager that is configured to receive the output probability distribution vector, select an action from an action space based at least in part on the predetermined dialog management policy, and provide the selected action to a dialog generator that is configured to generate a natural language response based at least in part on the selected action and the information retrieved from the database.

5. The system of claim 4, wherein, based at least in part on the returned value of the dialog complexity estimator being greater than a threshold, the system does not query the database but does generate a system utterance that generates a clarification question, and wherein based at least in part on the returned value of the dialog complexity estimator being less than or equal to the threshold, the system queries the database and generates a responsive system utterance based at least in part on a result of the query.

6. The system of claim 1, wherein the method further includes terminating the dialog upon a predetermined upper turn limit being reached.

7. A computer-implemented method for implementing multi-turn dialogs via retrieval of information from multiple tables of a database comprising:
receiving as inputs, by a dialog handler of a computing system, an upper limit of dialog turns and training data comprising a series of user utterances and a series of responsive system utterances;
wherein each system utterance of the series of responsive system utterances is responsive to a different user utterance of the series of user utterances;
wherein a dialog comprises a number of turns, wherein each turn comprises a respective pair of user and responsive system utterances; and
training, by the dialog handler, a dialog management policy of a dialog manager based at least in part on the received inputs and on a reward function measured at each turn of the dialog;
wherein for each turn of the dialog the reward function is configured to output a reward value that is based at least in part on an accuracy of the responsive system utterance of the turn and on the number of dialog turns elapsed;
wherein the reward function incorporates a dialog complexity estimator that is configured to calculate a query cost associated with querying the database;
wherein the dialog complexity estimator is configured to return a value of zero, one, or between zero and one; and
wherein the reward function incorporates the dialog complexity estimator by at least augmenting a state space of the predetermined dialog management policy to include an additional dimension that corresponds to the returned value.

8. The computer-implemented method of claim 7, wherein:
training the dialog management policy of the dialog manager includes providing the training data and the upper limit of dialog turns to a supervised learning neural network; and
the training data includes labeled dialog data and the reward values of the series of responsive system utterances.

9. The computer-implemented method of claim 7, wherein:
training the dialog management policy of the dialog manager includes providing the training data and the upper limit of dialog turns to a reinforcement learning neural network; and
the training data includes unlabeled dialog data and the reward function.

10. The computer-implemented method of claim 7, wherein the dialog management policy is defined over the augmented state space.

11. The computer-implemented method of claim 7, wherein:
the reward function incorporates the dialog complexity estimator further by at least:
modifying the reward function by specifying the reward function over the augmented state space and subtracting the output of the reward function by a function of the return value of the dialog complexity estimator.

12. The computer-implemented method of claim 7 further comprising training a belief tracker based at least in part on the received inputs and on the reward function.

13. A computer program product implementing multi-turn dialogs, the computer program product comprising a computer readable storage medium having program instructions embodied therewith, wherein the computer readable storage medium is not a transitory signal per se, the program instructions executable by a system operatively coupled to one or more processors to cause the system to perform a method comprising:
- receiving, by a dialog handler of the system, a series of user utterances; and
- generating, by the dialog handler, based at least in part on a trained dialog management policy and information retrieved from multiple tables of a database, a series of responsive system utterances;
- wherein each system utterance of the series of responsive system utterances is responsive to a different user utterance of the series of user utterances;
- wherein a dialog comprises a number of turns, wherein each turn comprises a respective pair of user and responsive system utterances;
- wherein the trained dialog management policy was trained based at least in part on executing a reward function at each given turn of a prior dialog;
- wherein for each given turn of the prior dialog the reward function is configured to output a reward value that is based at least in part on an accuracy of a responsive system utterance of the given turn and on the number of dialog turns elapsed;
- wherein the reward function incorporates a dialog complexity estimator that is configured to calculate a query cost associated with querying the database;
- wherein the dialog complexity estimator is configured to return a value of zero, one, or between zero and one; and
- wherein the reward function incorporates the dialog complexity estimator by at least augmenting a state space of the predetermined dialog management policy to include an additional dimension that corresponds to the returned value.

* * * * *